July 20, 1948.  H. M. CARLSEN ET AL  2,445,601
FISH HOOK
Filed April 15, 1946
Fig.1
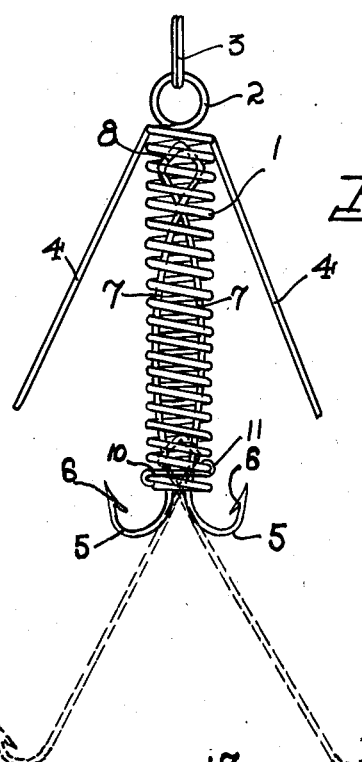
Fig.2
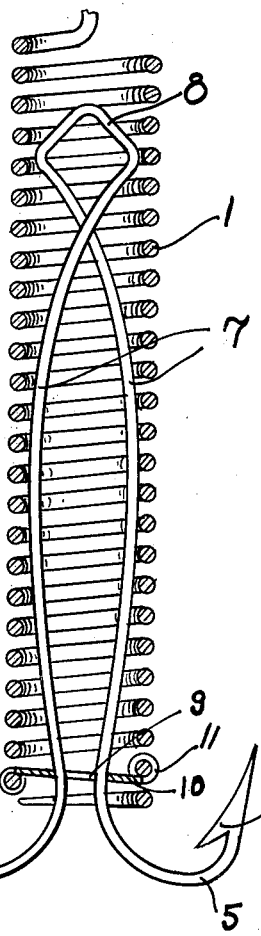
Fig.3
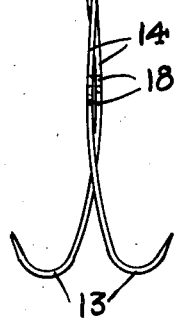
Fig.4
Herbert M. Carlsen
Edwin F. Nordman
INVENTORS
BY Glenn L. Fish
ATTORNEY Patented July 20, 1948

2,445,601

UNITED STATES PATENT OFFICE 2,445,601

FISHHOOK

Herbert M. Carlsen and Edwin F. Nordman, Spokane, Wash.

Application April 15, 1946, Serial No. 662,278

4 Claims. (Cl. 43—36)

This invention relates to a fish hook and it is one object of the invention to provide a fish hook so formed that while companion hooks will be normally held close to each other pull exerted when a fish is caught will cause the hooks to spread and thus make it difficult to dislodge them from the mouth of a fish.

Another object of the invention is to provide a hook wherein a pair of hooks so formed from a single strand of resilient wire bent to form shanks which are integrally united at their upper ends and so shaped that while they may be held close to each other they will quickly spring apart when pull is exerted upon the hooks.

Another object of the invention is to provide a fishing hook wherein the shanks of the hooks extend longitudinally through a helical spring with which the shanks and a head formed by connected ends of the shanks frictionally engage and prevent the hooks from sliding too freely through the spring to an extended position.

Another object of the invention is to provide the helical spring with means for preventing entire separation of the hooks from the spring when pull is exerted by a fish.

Another object of the invention is to provide a hook wherein the shanks of the connected hooks are formed with transverse offsets so that after the hooks have been twisted and brought toward each other the offsets will overlap and releasably hold the hooks against spreading.

The invention is illustrated in the accompanying drawings wherein:

Fig. 1 is a side view of a hook of the improved construction.

Fig. 2 is a view upon an enlarged scale showing the spring in section and the hooks in elevation.

Fig. 3 is a side elevation of a hook of modified construction.

Fig. 4 is a view taken at right angles to Figure 3.

The hook shown in Figs. 1 and 2 has a body consisting of a helical spring 1 formed of resilient wire and having its convolutions spaced from each other, the upper end of the strand from which the spring is formed being bent to form an eye or loop 2 through which a ring 3 is mounted so that a fishing line may be tied to the ring. Weed guards 4 extend from the upper end of the spring in diverging relation thereto to prevent the hooks 5 from catching in grass or weeds when pulled through water. The hooks 5 are formed from a single strand of resilient wire which has its end portions bent to form the bills of the hooks, the bills being formed with the usual barbs 6. Midway its length the wire strand is bent to form the shanks 7 of the hooks, and upon referring to Fig. 2 it will be seen that the shanks are bowed longitudinally away from each other and have their upper ends integrally connected by a bridge 8 of inverted V-shape which may be referred to as a head or coupling member for the shanks. The shanks slidably pass through an opening 9 formed through a plate 10 which is disposed within the lower end portion of the spring and secured by tongues 11 bent about a convolution of the spring and when the hook is in the normally raised or retracted position shown in Fig. 2 the bills will be held close to each other and may be readily taken into a fish's mouth. When a fish takes the bait and pull is exerted upon the hook it will be slid longitudinally through the spring to the extended position indicated by dotted lines in Figure 1 and the shanks will move away from each other and become so firmly engaged in the mouth of the fish that the fish can not dislodge the hook. The width of the head or bridge 8 is such that it can not pass through the opening 9 and therefore the hook may not become entirely detached from the spring and the fact that the body portion of the device is formed as a helical spring will allow sufficient give to absorb excessive strains when a fish attempts to run away and the fishing line will not be broken. After a fish has been removed from the bills of the hook it is merely necessary to grasp the bills and push the hook forwardly to return it to its normally retracted position.

In Figs. 3 and 4 there has been disclosed a hook of modified construction. In this embodiment of the invention the double hook 12 is formed from a strand of resilient wire having end portions bent to form bills 13 at ends of shanks 14. Upper ends of the shanks are connected by a bridge 15 including a coil 16 disposed between the upper ends of the shanks of the hooks and having its upper portion spaced downwardly from the top of the bridge. A ring 17 passes through the bridge and its coil and a fishing line is tied through this ring when the hook is in use. The shanks 14 are each formed as an elongated reversed curve so that they may be brought together and overlapped as shown in Fig. 3 and so held by overlapped abutments 18 which project toward each other from the shanks and are formed by crimping the shanks as shown in Fig. 4. When the bait is taken by a fish and pull exerted on the coil 16, one of the shanks will be shifted longitudinally and the abutments or keepers moved out of overlapping engagement with each other and the shanks may then spring apart and the bills 13 will be prevented from becoming dislodged from a fish's mouth. After a fish has been removed from the hook it is merely necessary to press the shanks toward each other and the abutments will be moved into overlapping engagement with each other and frictionally hold the shanks in the normal position.

Having thus described the invention, what is claimed is:

1. A fish hook comprising a helical spring having its convolutions spaced from each other and an eye at its upper end, a plate adjacent the lower end of said spring having tongues engaged about a convolution and mounting the plate in the spring, and a strand of resilient wire bent midway its length to form a bridge and shanks extending therefrom, the bridge being of inverted V-shape and the shanks being bowed longitudinally in opposite directions and crossed near the bridge and having their lower portions slidably passing through an opening in the plate and their lower ends bent to form bills extending away from each other.

2. A fish hook comprising a helical spring, means at the upper end of said spring for connecting the same with a fish line, a plate mounted in the spring and formed with an opening, and a strand of resilient wire bent midway its length to form a bridge and shanks extending rearwardly therefrom, the shanks being disposed in crossed relation to each other and being curved longitudinally for frictional gripping engagement with convolutions of the spring and slidably passing through the opening in the plate and having their lower ends bent to form bills.

3. A fish hook comprising a helical spring having means at its upper end for connection with a fish line, a plate mounted in said spring and formed with an opening, and a multiple hook slidable longitudinally in the spring and having a bridge at its upper end and shanks extending downwardly from the bridge and through the opening in the plate and having their lower ends bent to form bills.

4. A fish hook comprising a helical spring having means at its upper end for connection with a fish line, a multiple hook slidable longitudinally through said spring and having a bridge formed as a bar extending transversely through the spring and shanks extending downwardly from opposite ends of the bridge, ends of the bridge being frictionally engaged with inner surfaces of convolutions of the spring to yieldably resist sliding movement longitudinally in the spring, the shanks being biased for movement away from each other as they move downwardly through the spring and outwardly through the lower end thereof and having their lower end portions bent to form bills, and a barrier in the lower portion of the spring formed with an opening through which the shanks pass and serving to limit downward sliding movement of the hook through the spring.

HERBERT M. CARLSEN.
EDWIN F. NORDMAN.

REFERENCES CITED

The following references are of record in the file of this patent:

UNITED STATES PATENTS

| Number | Name | Date |
|---|---|---|
| 534,694 | Kienle | Feb. 26, 1895 |
| 618,764 | Anderson | Jan. 31, 1899 |
| 650,277 | Rossner | May 22, 1900 |
| 814,624 | Robinson | Mar. 6, 1906 |
| 1,056,397 | Bonnell | Mar. 18, 1913 |
| 1,172,780 | Ferree | Feb. 22, 1916 |

FOREIGN PATENTS

| Number | Country | Date |
|---|---|---|
| 1,828 | Great Britain | Jan. 25, 1909 |
| 631,625 | France | Sept. 5, 1932 |